United States Patent Office 3,729,538
Patented Apr. 24, 1973

3,729,538
METHOD FOR PREPARING VAPOUR PERMEABLE FLEXIBLE SHEET MATERIALS
Victor Ralph Cunningham, Dagenham Dock, and David Leonard Boutle, Maldon, England, assignors to Porous Plastics Limited, Essex, England
Continuation of application Ser. No. 697,154, Jan. 11, 1968, now abandoned. This application Oct. 2, 1970, Ser. No. 90,192
Claims priority, application Great Britain, Jan. 11, 1967, 1,608/67
Int. Cl. B29d 27/04; C08g 53/08
U.S. Cl. 264—49
16 Claims

ABSTRACT OF THE DISCLOSURE

For a method of making water vapour permeable flexible sheet materials which find uses as replacements for leather in which the material is formed from a layer of a mixture of powdered removable filler dispersed through a polymer solution which adheres to a temporary backer and is coagulated and the filler leached out by suitable liquid treatment the advantages of certain ratios of polymer to solvent and certain relatively high ratios below 3:1 of filler to polymer in the mixture are set out.

---

Figure 1:
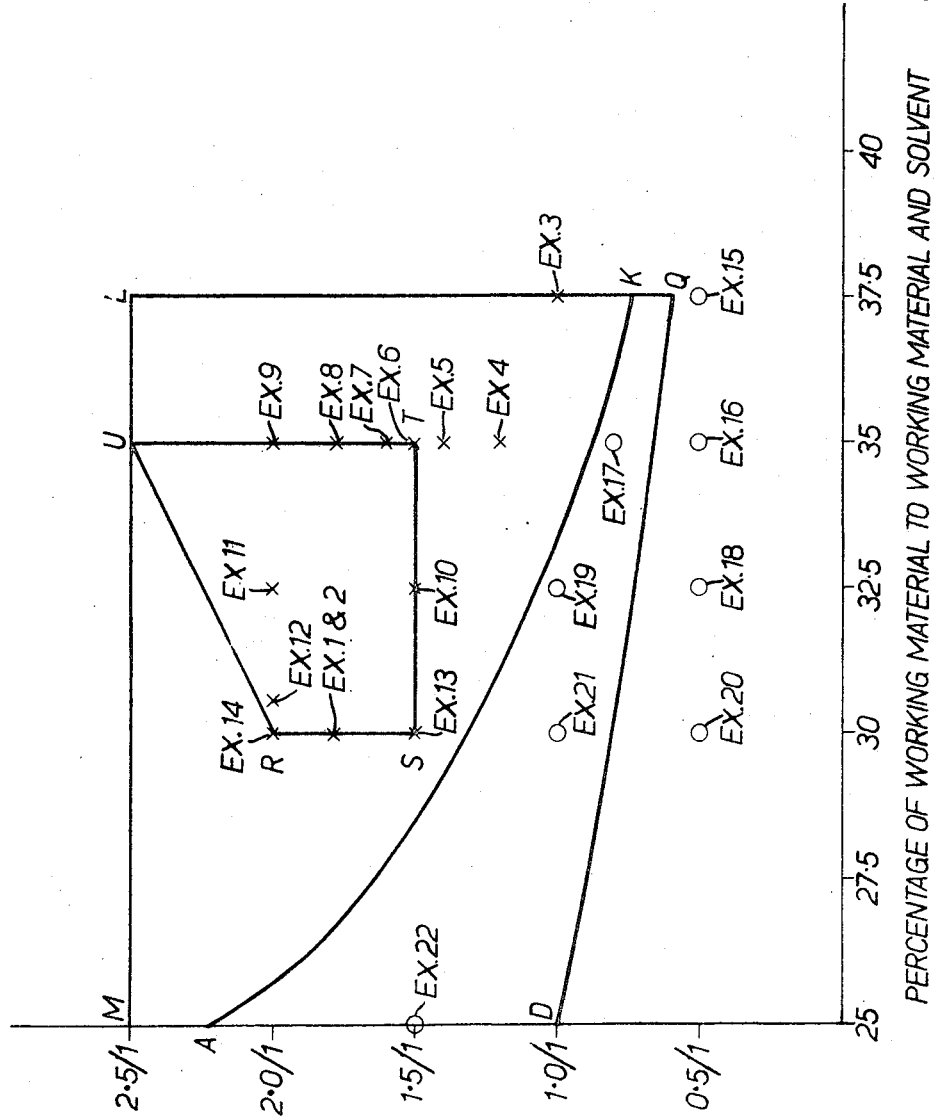

This is a continuation of application Ser. No. 697,154, filed Jan. 11, 1968 and now abandoned.

This invention relates to the making of water vapour permeable flexible sheet materials and particularly, though not exclusively, man-made leather-like materials and is an improvement in or modification of the invention set forth in the applicants' copending U.S. application Ser. No. 479,337 filed Aug. 12. 1965.

In the methods described in the parent specification water vapour permeable flexible sheet material is made by forming a mixture including a synthetic polymeric plastics working material in a solvent having distributed through it a removable solid filler, shaping the mixture, and treating the shaped mixture with a coagulating agent which is not a solvent for the working material but is at least partially miscible with the solvent so as to coagulate the working material into a sheet, and removing the filler by treating the shaped mixture with the same coagulating agent or another coagulating agent which is also not a solvent for the working material, the choice of coagulating agent and time of treatment being selected to ensure that substantially all the filler is removed. The mixture may comprise a polyurethane working material, N,N-dimethyl formamide (DMF) as the solvent, and sodium chloride as the filler, whilst the coagulating agent or agents may be water. The filler may have a substantial number of particles whose diameters fall within the range 7–25 microns.

The parent specification envisages a wide range of ratios of filler from .5 parts by weight to 6 parts by weight of filler to 1 part of working material but all the embodiments specifically described employ a ratio of 3 to 1 or more.

It has now been found that in certain respects improved materials are obtained by selecting a ratio of filler to working material less than 3 to 1. In particular the toughness or wear resistance and resistance to tear propagation tend to fall off with increase of the proportion of filler.

On the other hand it is found that reduction of the filler ratio beyond a certain point, dependent on the ratio of working material to solvent, results in a material having a different structure. This structure, which may be termed "cellular" comprises a microporous matrix having interconnected micropores providing permeability, and a number of much larger pores, which will be called macropores, which do not extend from face to face of the sheet and are of such size as to be visible to the unaided eye when a cross section of the sheet is viewed in normal daylight. In the normal structure, which may be termed "non-cellular", on the other hand, there are no macropores and the microporous structure is more nearly homogeneous.

A method of forming the cellular structure is disclosed in applicants' copending U.S. application Ser. No. 697,164 filed Jan. 11, 1968.

In general the "cellular" structure tends to be weaker and less tough than the non-cellular structure, and hence for purposes such as man-made leather-like materials for shoe uppers in which strength and toughness are required, it may be desirable to avoid the "cellular" structure. Thus the selection of materials having a ratio of filler to working materials in conjunction with a ratio of working material to solvent below the area in which the materials of the parent application fall, but above the area in which the "cellular" structure occurs, is believed to result in a particularly favourable combination of properties, notably toughness or wear resistance and water vapour permeability.

Indeed the production of a sufficiently tough and strong water vapour permeable microporous synthetic polymeric material may make it practicable to eliminate the necessity for employing a lining or backing or permeanent support of woven or fibrous material in order to impart the necessary strength to an artificial leather, thereby effecting considerable economy in addition to eliminating certain disadvantages which occur when a fibrous support is used.

Such a material, which will be referred to as a fleeceless material, is described in applicants' copending U.S. application Ser. No. 819,656 filed Apr. 28, 1969.

This proposal also overcomes a difficulty experienced with certain prior proposals for shoe upper materials, which use fibrous supports made from felts or fleeces consolidated by needle punching, that the resultant variations in density in the felt show up as surface irregularities when the material derived from them is stretched. This problem is aptly referred to as the "orange peel effect" and does not occur with materials using the fleeceless "non-cellular" material of the present invention.

Thus according to the present invention a method of making a water vapour permeable flexible sheet material which includes forming a spreadable mixture comprising a solution of a film forming flexible synthetic polymeric thermoplastic elastomeric working material in a solvent having distributed through it a removable solid filler ground to a narrow range of particle sizes, forming a continuous layer of the mixture on a temporary backer to which the layer adheres, treating the layer on the backer with a coagulating liquid which is a non-solvent for the working material but is a solvent for the removable filler and is at least partly miscible with the solvent for the working material, so as to coagulate the working material into a sheet, and removing substantially all the solvent and the removable filler by washing the material with a coagulating liquid, drying the resultant water vapour permeable flexible sheet material, and stripping it from the backer, is characterised in that the ratio in parts by weight of filler to working material and the ratio in parts by weight of working material to solvent in the mixture fall within the area defined by the closed figure A–K–L–M–A of the diagram, FIG. 1, of the accompanying drawings but above the line A–K.

The washing of the material to remove the solvent and the filler may be merely immersing the material in coagulating liquid or may be washing with fresh coagulating liquid or continuing the treatment with the liquid used to achieve the actual coagulation.

Such materials are likely to have a "non-cellular" structure as defined above and this likelihood can be increased by suitable selection of the parameters of the thickness of the layer, the temperature at which coagulation is carried out, and the filler particle size.

However, apart from the question whether or not the material contains macropores other factors may be of importance, for example adequate water vapour permeability, and especially strength including resistance to wear and to tearing, and ease of working, especially ease of spreading.

With higher ratios of working material to solvent the viscosity increases to a point at which spreading of the layer becomes difficult; on the contrary if this ratio is unduly reduced the strength is liable to suffer.

With higher ratios of filler to working material (within the broad area covered by the invention) permeability should generally meet requirements and strength tends to be the critical factor, and hence if the proportion of filler is increased the proportion of working material to solvent should also be increased. On the other hand at lower proportions of filler to working material the permeability may still be sufficient to meet requirements, and in addition the question of strength presents less difficulty, so that as the proportion of working material to solvent is increased adequate strength can be maintained without fear of macropores occurring over a range of proportions of filler to working material.

Effecting a balance between all these considerations it is preferred to use ratios in parts by weight of filler to working material and ratios in parts by weight of working material to solvent in the mixture falling within the area defined by the closed figure R–S–T–U–R in the diagram, FIG. 1 of the accompanying drawings.

Preferably the ratio in parts by weight of filler to working material is in the range 1.5 to 1 to 2.0 to 1 and the ratio in parts by weight of working material to solvent is in the range 30:70 to 35:65. Preferably the filler is ground so that more than 50% of the particles have diameters in the range 4 to 20 microns. The average diameter of the particles may be in the range 10 to 14 microns and is preferably 13 microns; the standard deviation on either side of the average being 4.5 microns. This particle size will be referred to as 13±4.5 microns (one standard deviation) in the rest of the specification. A suitable filler is sodium chloride. These particle sizes are measured by means of a Photo-extinction Sedimentometer manufactured by Evans Electro Selenium Ltd., Model No. 41 used in accordance with the manufacturers' instructions based on papers by H. E. Rose in "Engineering" of Mar. 31, and Apr. 14, 1950 and "Nature" of 1952, vol. 169, p. 287.

The precise ratio of working material to solvent and of filer to working material at which the cellular structure occurs depends to some extent on the particle size of the filler, and if the particle size of the filler is reduced the range of parameters within which cellular structure is found to occur will be reduced.

It is found that for a given weight of filler, a reduction of filler particle size tends to increase the permeability of the product without markedly affecting its tensile strength.

It is thought that within the area A–D–Q–K–A a "non-cellular" material can be obtained if the particle diameter of the filler as measured by the method described above is predominantly less than 10 microns. However, it is preferred not to work in this area in view of the uncertainty which exists as to which structure will be obtained.

Within the range represented by the area A–K–L–M–A of the diagram, FIG. 1, of the accompanying drawings it is believed that a "non-cellular" structure can be achieved with a wider range of particle size.

It appears that if the moisture content of the sodium chloride is very mrch lower than 0.2–0.4% e.g. less than 0.05% w. or much greater e.g. above 0.5% the tendency for macropores to occur is increased. It is thus preferred to use salt with a moisture content of about 0.2–0.4% w. Similarly the results obtained under milling conditions more humid than 50% RH at 25° C. seem to indicate a tendency for increased occurrence of macropores with increased humidity. It is thus preefrred to use milling conditions of about 50% RH at 25° C. It is also desirable for the milling to be very thorough to ensure that the dispersion of the salt in the polyurethane solution is homogenous since formulations which are not sufficiently milled are liable to have macropores.

Provided the ratios fall within the preferred area R–S–T–U–R macropores are unlikely to be produced. However, in the case of the particle sizes at the low end of the range quoted above, the tendency of the sodium chloride to absorb moisture is increased and care must be taken to ensure that the preferred moisture content of 0.2–0.4% w. for the sodium chloride mentioned above is not exceeded and the preferred milling conditions set out above are fulfilled. In addition the coagulation temperature should be kept down if macropores are to be avoided.

Preferably the mixture used to form the layer is applied in a single coating step in such a way as to achieve a leached and dried microporous product whose thickness is greater than 1 mm., and preferably is in the range 1.0 to 1.2 mm.

The preferred working materials are polyurethanes derived from polyesters, polyethers or polycaprolactones.

Examples of polyester-based resins are those sold under the trade names Elastollan TN61 EH98AK and Texin. A suitable polyether based resin is that sold as Elastollan TN63 PA98AK. A suitable caprolactone-based polyurethane is that sold as Elastollan TN65 EN98AK.

Solvents for the working material which may be employed include dimethyl formamide, dimethyl sulphoxide, N-methyl pyrrolidone and dimethyl acetamide, but the actual solvent chosen will depend on the working material employed. Thus for Elastollan TN61 EH98AK, dimethyl formamide is preferred.

Dimethyl formamide can be diluted with other cheaper solvents such as toluene and methyl ethyl ketone which although not solvents for the polyurethane on their own do not act as non solvents when mixed with dimethyl formamide.

A preferred working material is a thermoplastic elastomeric polyurethane derived from a polyester by reaction with a diol and a di-isocyanate, and in particular one in which the polyester comprises the condensation reaction product of adipic acid and ethylene glycol, the diol comprises 1,4-butylene glycol and the di-isocyanate comprises 4,4'-diphenylmethane di-isocyanate, and the isocyanate is used in very slight molar excess. Part of the ethylene glycol may be replaced by 1,4-butylene glycol.

A preferred coagulating liquid is water.

The temporary backer is preferably a sheet of porous synthetic plastics material, which may conveniently be formed by sintering powdered thermoplastic polymer. The thermoplastic polymer may be a high density polyethylene. One particular such backer which has been found suitable is .067"±.004" thick, has a permeability of 18±4 cubic ft./min. air at a pressure of 8" static water gauge and weighs 114 grams/sq. ft.

An example of such a material is that sold under the trade name Vyon. Such a material is formed by spreading an even layer of Ziegler high density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is on this smoother face that the layer is formed.

In a preferred form of the invention the filler is sodium chloride, the working material comprises thermoplastic elastomeric polyurethane derived from a polyester by reaction with a diol and a di-isocyanate, the solvent comprises dimethylformamide, and the mixture is formed by dissolving the polyurethane in the dimethylformamide and then milling dried sodium chloride into the solution under conditions of low humidity until a homogenous dispersion is obtained. Preferably the moisture content of the salt is in the range of 0.2–0.4% by weight and the milling conditions are not more humid than 50% RH at 25° C. In this form of the invention the layer is knife coated on to the backer as it passes around a roll, the layer being applied to the backer between a doctor knife which is preferably vertical and an upstream inclined backing plate located before the doctor knife from the point of view of the movement of the backer.

Preferably the coagulation is carried out by immersing the layer on the backer, coated face downwards in water at 20° C. Conveniently the material is immersed in the cold, for example at 20° C., in the coagulating liquid until insufficient solvent remains to cause collapse of the porous structure on heating and then the filler is removed to an adequate level by mangling the material in heated coagulating liquid, for example at 60° C., which is passed in countercurrent to the material.

It is believed that material having parameters which fall within the particular areas A–K–L–M–A and especially R–S–T–U–R have desirable properties that are not possessed by materials in which the content of filler is either greater or less. Broadly speaking if the proportion of filler is increased the structure of the material may be regarded as becoming more open so that the vapour permeability increases but correspondingly the strength or toughness decreases. Conversely if the proportion of filler is reduced the point is reached at which the structure becomes "cellular," and this again reduces the strength or toughness or wear resistance or resistance to tear propagation of the material, although in this case in general there is no notable increase in water vapour permeability but a decrease in resistance to liquid water penetration.

It will be noted that the lower limit of the ratio of working material to solvent in the selected area referred to above is set at about 25:75. Thus if this ratio is further reduced, that is to say if the proportion of solvent is increased, the effect is somewhat similar to that of increasing the ratio of filler to working material above 3:1 in giving a more open and weaker structure. As regards the upper limit of this ratio, this is set by the practical question of providing sufficient solvent to form a spreadable mixture capable of being formed into a continuous layer.

In addition to the parameters of working material concentration, proportion of filler, and filler particle size which may have a critical influence on the properties of the product, there are other parameters which exert a less marked or distinguishable influence. For example, the spreading gap employed when forming the layer of working material on the temporary support, apart from determining the thickness of the product, also influences the permeability and tear strength of the product. In general it was found that, for "non-cellular" materials the tear strength increased with increase of the spreading gap while the permeability decreased.

The invention may be put into practice in various ways but one specific proces and a number of alternative formulations embodying the invention will be described by way of example and with reference to the accompanying diagrams, in which:

FIG. 1 is a graph with ratios in parts by weight of working material to solvent expressed as percentages of working material as abscissae, and the corresponding ratios in parts by weight of filler to working material as ordinates. Those samples which were "cellular" are represented by circles, while those which were "non-cellular" are represented by crosses; and FIG. 2 is a flow diagram of the process for the preparation of a single layer or substrate material.

GENERAL DESCRIPTION OF THE PROCESS

Figure 2:
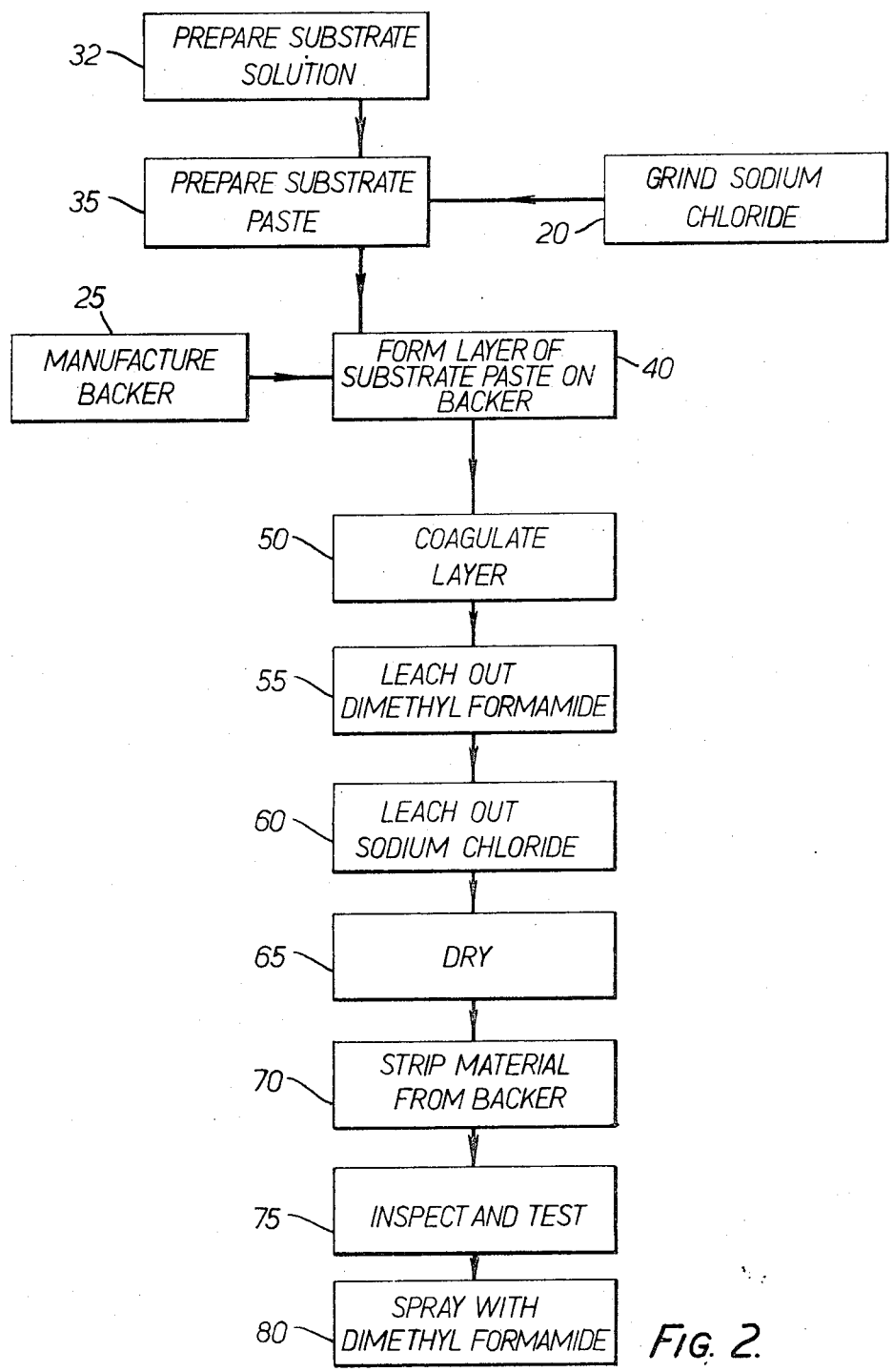

Referring to FIG. 2 the main stages of the process are numbered 32 to 80. There are two ancillary stages, those of grinding the sodium chloride to a narrow range of fine particle sizes, stage 20, and manufacturing the backer, stage 25. The backer is a sheet of porous sintered high density polyethylene and is formed by spreading an even layer of Ziegler high density polyethylene powder on a smooth metal conveyor belt, passing the layer on the belt through a suitably heated oven to cause the particles to sinter, cooling the sintered sheet and stripping it from the belt. The surface of the resultant sintered sheet which was in contact with the smooth metal surface is smoother than the other face, and it is on this smoother surface that the mixture is spread.

In general terms the main stage of the process consists of preparing a substrate paste containing a solution of a polyester based polyurethane dissolved in dimethyl formamide, and finely divided sodium chloride. These are stages 32 and 35. The substrate paste is used to form the materials in accordance with the present invention which find particular uses as substrates for man-made leather-like materials. Optional additional coatings my be formed on the material in accordance with the present invention, or it may be provided merely with a surface finish.

A layer of the substrate paste is spread on the backer. This is stage 40.

The coated backer, held under suitable tension throughout this stage of the process, is smoothly immersed, coated face down, in water and washed with water (for example at 20° C.) until the polyurethane has all been precipitated out of solution and all the dimethyl formamide has been removed. These are stages 50 and 55. The remainder of the sodium chloride is then removed by leaching with water heated (for example to 60° C.) and the material dried with the layer uppermost, care being taken that the heating does not warp the backer. Twenty minutes in an oven at 120° C. is suitable. These are stages 60 and 65.

After being dried it is carefully stripped from the backer. This is stage 70. It may be easier to do this whilst the material is still hot. This process imparts a fibrous or flesh surface appearance to the surface which was in adherence with the backer.

The backer is then treated to enable it to be reused if possible and returned to stage 25 of the process for reuse or recovery.

The material is then inspected and tested, stage 75, and if it comes up to specification may optionally be given further coatings as mentioned above and/or a surface finishing treatment by spraying with dimethyl formamide and drying. This procedure may be in accordance with the invention disclosed in U.S. application Ser. No. 621,124 filed Mar. 7, 1967 in the name of Hull (now abandoned). This is stage 80. This imparts a high quality calf grain appearance to the surface of the material. It may also be given other optional treatments mentioned below.

DETAILED DESCRIPTION OF THE PROCESS

Stage 20—Grinding the filler

Satisfactory results are obtained when the majority of the particles are between 4 and 20 microns in diameter the preferred average particle diameter being 13±4.5 microns (one standard deviation). The particle size of the salt is measured on a Photo-extinction Sedimentometer manufactured by Evans Electro Selenium Limited, Model No. 41 used in accordance with the manufacturers' instructions based on papers by H. E. Rose in "Engineering" of Mar. 31 and Apr. 14, 1950 and "Nature" of 1952 volume 169, page 287.

Care must be taken to ensure that the particles in the test suspension have not agglomerated and this can be achieved by applying ultrasonic vibrations to the test suspension, these of course must be such as not to break up the individual particles but merely any agglomerates. The grinding is performed by re-circulating the sodium chloride between a grinder producing particles somewhat on the coarse side and a classifier which separates the particles that are too coarse and returns them to the grinder. Typically approximately 50% of the total mass is returned for regrinding. The grinder may be of the type comprising a pair of co-axial discs which can be rotated at different speeds or in opposite directions, each disc having concentric rings of pegs projecting from it and lying between the rings of pegs of the companion disc.

The material which is ground consists of sodium chloride crystals having a moisture content not in excess of 0.2–0.4% w. to which are added between 0.4 and 0.7% w. of a co-precipitated lime and silica anti-caking agent of 0.55 mircon (55 A.) average particle diameter, for example that sold as Microcal 160 (trademark). The ground sodium chloride is sealed in cans and stored under dry conditions so that the moisture content of the ground salt does not exceed 0.2–0.4% w. and is preferably about that value.

Stage 25—Manufacturing the backer

The temporary backer is a sheet of porous synthetic plastics material, formed by spreading an even layer of Ziegler high density polyethylene powder on a smooth metal surface and then placing the smooth metal surface and the layer in a suitably heated oven to cause the particles to sinter. The surface of the resultant sintered sheet which was in contact with the smooth metal surface is smoother than the other face and it is on this smoother face that the layer is formed.

The material is 22" wide, 0.067"±0.004" thick, has a permeability of 18±4 cubic ft. air/minute at a pressure of 8" static water gauge and weighs 114 grams/ft.$^2$.

Stages 30 to 36—Preparing the substrate paste

The working material from which the man-made leather-like water vapour permeable flexible sheet material is made is a polyester based polyurethane which is made as follows.

The starting material is a linear polyester containing hydroxyl groups which is made from adipic acid and ethylene glycol, which has a molecular weight of approximately 2,000, a hydroxyl index around 50 and an acid number of 1. 1,000 g. of this polyester is heated to approximately 120° C. with 90 g. 1,4-butylene glycol, both re-agents having been adequately desiccated beforehand. 400 g. of solid 4,4'-diphenylmethane di-isocyanate is added to the heated mixture with vigorous stirring, which is continued until the solid has dissolved, the temperature reaching about 100° C. After about two minutes the liquid is poured on to plates preheated to between 110° C. and 130° C. After about ten minutes the mass is stripped from the plates, allowed to cool to room temperature, and granulated in a conventional granulating machine. This material has a Shore hardness of 98 on the A scale at 25° C. A 10% w. solution in dimethyl formamide has a viscosity of the order of 15 to 30 centipoise at 25° C.

In a modification of this material part of the ethylene glycol is replaced by 1,4-butylene glycol so that the basic polyester is in fact a copolymer of two diols.

The material may also contain conventional stabilisers.

Stage 32 of FIG. 2, preparing the substrate solution, is carried out by weighing out 3 parts by weight of this polymer and dissolving this in 7 parts by weight of dry dimethyl formamide (less than 0.01% of moisture, supplied by I.C.I. Ltd. in accordance with their specification for dry dimethyl formamide) in a vertical mixer with a high rate of shear, e.g. a Silverson mixer. Care must be taken to keep the temperature below 40° C. during mixing on degradation of the polyurethane is liable to occur. The substrate solution is stored under dry conditions.

Care must be taken when handling dimethyl formamide solutions since the vapour is toxic and also hygroscopic. Thus when possible the mixing stages are enclosed and are kept at low humidity ideally less than 50% RH at 25° C. Stage 35, preparing the substrate paste, is carried out as follows. 100 parts by weight of filtered substrate solution are placed in a paddle type mixer and 53.4 parts by weight of ground salt taken from sealed cans is added after being sieved through a 60 mesh British Standard screen in a vibratory sieve.

This is mixed in a paddle type mixer and then milled on a Torrance triple roll mill to produce a homogenous dispersion. Two passes through the mill produces a dispersion which, when tested with a Hegman gauge, is indicated by a reading of 6.5 to 7 to have present no particles greater than 14 microns in diameter. This dispersion, the substrate paste, is stored under dry conditions. To summarise the substrate paste has the following composition:

EXAMPLE 1

| | Parts by weight |
|---|---|
| Polyurethane (15–30 centipoise at 25° C.) | 30 |
| Ground sodium chloride (average particle diameter 13±4.5 microns (one standard deviation)) | 53.4 |
| Dimethyl formamide | 70 |

It has a viscosity of the order of $1.5 \times 10^6$ centipoise at 25° C.

Stage 40—Forming the layer

The backer which has been stored under dry conditions is passed round an 18" diameter ground steel spreading roll underneath a doctor knife blade and down under a guide roll into a coagulating tank.

The substrate paste is mixed to eliminate any settling of the sodium chloride and de-aired under vacuum in a mixer and then supplied to the doctor knife.

This is set to provide a gap setting between the backer and the blade such that a 0.090" wet coating 18" wide is produced. This layer when leached and dried weighs 450 grams/in.$^2$ and is 0.050" or 1.2 mm. thick.

Stage 50—Coagulating the layer

As mentioned above the coated backer enters the tank by passing under a guide. Located along the inside of the side walls of the tank are horizontal channels through which slide the uncoated edges of the 22" wide backer. The backer emerges out of the tank around a guide roll and through a constant speed wind up arrangement driven by a variable speed motor and gearing and is fed on to a wind up roll.

The backer with layer on it is run at 4'/minute into the tank of water maintained at 20° C. with, it will be appreciated, its coated face downwards. The layer is thus immersed within about half a minute of being formed. The entry to the water is done as smoothly as possible so as to avoid the formation of ripples on the surface of the layer.

Alternatively the coating may be passed through an atomised spray of water just before it is immersed.

The channels and the tension in the backer hold it about 2" below the surface of the water. Fresh water is pumped into the tank from both ends and the level is maintained by an overflow at the centre of the tank. The water is maintained at 20° C. by a steam jacket 507 at the bottom of the tank and plastic balls 506 floating on and covering the surface of the water.

The material is passed into the 60 ft. long tank and the total immersion time is 45 minutes. This is to allow the microporous polyurethane which precipitates out of solution in a few minutes to harden off. The material is kept with the coated surface down during this stage to prevent any air in the backer rising or being forced through the polyurethane layer thus forming bubbles or macropores.

The layer of polyurethane contracts during precipitation but the backer is tensioned and is such that warping and shrinkage in length or breadth does not occur to any disadvantageous degree.

Stage 55, leaching out the dimethyl formamide, is carried out as follows. The material is wound up on a roll which is transferred to a static cold water holding tank where the coils of the roll are allowed to loosen slightly. The material is held in this tank until the amount of dimethyl formamide left in the material is not sufficient to cause collapse of the porous structure on heating. About two hours are required for this stage.

Stage 60—Leaching out the sodium chloride

The material from the holding tank is passed in loops and through mangles with loads of about 300 lbs. through a series of leaching tanks arranged so that the water is fed in countercurrent to the material. This takes about four hours. The water is heated at 60° C. This removes sufficient sodium chloride to result in a satisfactory product.

Stage 65, drying the material, is carried out by passing the wet material coated side uppermost through an oven at 120° C. in twenty minutes. Any salt remaining tends to be deposited out in the backer rather than in the layer and thus does not interfere with the solvent spraying, stage 80.

This temperature and time in the oven does not cause the backer to warp.

Stage 70—Stripping the material from the backer

The material is separated from the backer, taken round a roll past circular edge trimming knives and wound up on a constant speed wind up roll, driven via a friction clutch so as to prevent undue stretching of the material. The backer is returned to the sintering plant for recovery or re-use and the material goes to Stage 75, inspection and testing. The material may then be given further coatings and/or be spray finished as mentioned above.

The material produced by this process, after spraying with the solvent, has the appearance of a high grade calf grain leather and this man-made leather-like material can be used as a replacement for such materials, for example as a men's shoe upper material.

Photomicrographs indicate that it has a fine even interconnecting pore structure.

EXAMPLE 2

The procedure of Example 1 was followed except that the coagulating temperature was 40° C. The sheet when dried was 1.2 mm. thick and was "non-cellular." The water vapour permeability of the product was measured by the desiccant method,* a figure of 4000 g./m.²/24 hours being obtained. The product showed satisfactory wear properties.

*The desiccant method for determining water vapour permeability is as described in BSS 3177/1959 but carried out at 38° C. with a nominal humidity gradient of 100% relative humidity.

EXAMPLES 3 TO 22

The procedure of Example 1 was followed but with the following different formulations.

| Example: | Filler: working material ratio | Working material: solvent ratio |
| --- | --- | --- |
| 3 | 1:1 | 37.5:62.5 |
| 4 | 1.2:1 | 35:65 |
| 5 | 1.4:1 | 35:65 |
| 6 | 1.5:1 | 35:65 |
| 7 | 1.6:1 | 35:65 |
| 8 | 1.78:1 | 35:65 |
| 9 | 2.0:1 | 35:65 |
| 10 | 1.5:1 | 32.5:67.5 |
| 11 | 2.0:1 | 32.5:67.5 |
| 12 | 2.0:1 | 30.6:69.4 |
| 13 | 1.5:1 | 30:70 |
| 14 | 2.0:1 | 30:70 |
| 15 | 0.5:1 | 37.5:62.5 |
| 16 | 0.5:1 | 35:65 |
| 17 | 0.8:1 | 35:65 |
| 18 | 0.5:1 | 32.5:67.5 |
| 19 | 1.0:1 | 32.5:67.5 |
| 20 | 0.5:1 | 30:70 |
| 21 | 1.0:1 | 30:70 |
| 22 | 1.5:1 | 25:75 |

These examples are plotted in FIG. 1. Those samples which were cellular are represented by circles, while those which were non-cellular are represented by crosses.

Inspection of FIG. 1 shows that the line M–L is at a 2.5/1 filler/working material ratio, lines A–M and L–K are at solvent percentages of 25% and 37.5% respectively, and point K is at a 0.75/1 filler/working material ratio.

Alternatively or in addition the material can be lacquered.

The material can alternatively be supplied by known techniques with one or more additional coatings, which may then be spray finished and/or lacquered.

What is claimed is:

1. A method of making a water vapor permeable flexible microporous sheet material free from fibrous reinforcement which comprises forming on a support a continuous layer of a spreadable mixture consisting essentially of a solution of elastomeric polyurethane working material in a solvent therefor and particles of a solid removable filler, the weight ratio of said filler to said elastomeric working material being in the range of 2.5:1 to 0.75:1 and the weight of said elastomeric working material being 25% to 37.5% of the total weight of said solvent plus said elastomeric working material, the composition of said mixture being such that said ratios and percentages fall within the closed area defined by A–K–L–M–A of the accompanying graph, FIG. 1; coagulating said layer, having said composition, by means of coagulating liquid, removing substantially all the solvent and removable filler of said layer by washing with coagulating liquid, the coagulating liquid being a non-solvent for said elastomeric working material, being a solvent for the removable filler and being at least partially miscible with the solvent for the elastomeric working material; and drying the resulting water vapor permeable flexible sheet material; said method including the step of stripping the coagulated layer from the support; the thickness of the layer of the uncoagulated mixture on the support being greater than 1 mm.

2. A method as claimed in claim 1 in which said ratios and percentages in the mixture fall within the area defined by the closed figure R–S–T–U–R of the graph, FIG. 1 of the accompanying drawings.

3. A method as claimed in claim 2 in which the ratio in parts by weight of said filler to said working material is in the range 1.5:1 to 2.0:1 and the percentage of said working material to said solvent is in the range 30:70 to 35:65.

4. A method as claimed in claim 1 in which the filler is ground so that more than 50% of the particles have a diameter within the range 4 to 20 microns.

5. A method as claimed in claim 4 in which the average diameter of the particles is in the range 10 to 14 microns.

6. A method as claimed in claim 1 in which the mixture used to form the layer is applied in a single coating step in such a way as to achieve a leached and dried microporous product whose thickness is greater than 1 mm.

7. A method as claimed in claim 6 in which the thickness is in the range 1.0 to 1.2 mm.

8. A method as claimed in claim 1 in which the polyurethane is derived from a polyester by reaction with a diol and a di-isocyanate, and the polyester comprises the condensation reaction product of adipic acid and ethylene glycol, the diol comprises 1,4-butylene glycol and the di-isocyanate comprises 4,4'-diphenylmethane di-isocyanate.

9. A method as claimed in claim 8 in which the polyester comprises the condensation reaction product of adipic acid and ethylene glycol, the diol comprises 1,4-butylene glycol and the di-isocyanate comprises 4,4'-diphenylmethane-di-isocyanate, and the isocyanate is used in very slight molar excess.

10. A method as claimed in claim 9 in which part of the ethylene glycol is replaced by 1,4-butylene glycol.

11. A method as claimed in claim 1 in which the polymer is a thermoplastic elastomeric polyurethane derived from a polyester by reaction with a diol and a di-isocyanate, the solvent therefor comprises a water miscible polar organic solvent and the filler has an average particle diameter in the range 10–14 microns, the percentage of said working material to said solvent in the mixture is about 30:70 and the ratio in parts by weight of said removable filler to said working material is about 1.78:1.

12. A method as claimed in claim 11 in which the solvent is dimethyl formamide, the filler is sodium chloride, the layer is formed so that when the sheet is dried it is about 1.2 mm. thick and the coagulation is carried out with water.

13. A method of making a water vapour permeable flexible sheet material as claimed in claim 1 in which the filler is sodium chloride, the working material comprises thermoplastic elastomeric polyurethane derived from a polyester by reaction with a diol and a di-isocyanate, the solvent comprises dimethyl formamide, and the mixture is formed by dissolving the polyurethane in the dimethyl formamide and then milling dried sodium chloride into the solution under conditions of low humidity until a homogeneous dispersion is obtained.

14. A method as claimed in claim 13 in which the moisture content of the salt is in the range 0.2–0.4% by weight and the milling conditions are not more humid than 50% RH at 25° C.

15. A method as in claim 1 in which said solvent for said elastomeric working material is water-miscible, said filler is water-soluble, and said coagulating liquid is aqueous.

16. A method as in claim 15 in which particles of said filler are water-soluble, more than 50% of said particles having diameters in the range of 4 to 20 microns, and said solvent for the elastomeric working material is selected from the group consisting of dimethyl formamide, dimethylsulfoxide, N-methyl pyrrolidone and dimethyl acetamide and blends thereof with toluene and with methyl ethyl ketone.

References Cited
UNITED STATES PATENTS

| | | | |
|---|---|---|---|
| 3,348,963 | 10/1967 | Fukushima et al. | 264—41 U X |
| 2,542,527 | 2/1951 | O'Conor Honey et al. | 264—49 |
| 2,707,201 | 4/1955 | Fernald et al. | 264—49 X |
| 2,810,932 | 10/1957 | O'Conor Honey et al. | 264—49 |
| 2,953,622 | 9/1960 | Gray | 136—146 X |
| 3,035,110 | 5/1962 | Corren | 136—146 X |
| 3,100,721 | 8/1963 | Holden | 260—77.5 MP UX |
| 3,188,243 | 6/1965 | Booth et al. | 136—146 X |
| 3,296,016 | 1/1967 | Murphy | 264—49 X |
| 3,348,963 | 10/1967 | Fukushima et al. | 260—77.5 MP X |
| 3,351,495 | 11/1967 | Larsen et al. | 264—49 UX |
| 3,388,100 | 6/1968 | Thoma et al. | 260—33.8 UR X |
| 3,524,753 | 8/1970 | Sharp | 264—49 X |
| 3,429,957 | 2/1969 | Merten | 264—212 X |

PHILIP E. ANDERSON, Primary Examiner

U.S. Cl. X.R.

161—159, 160, 164, 166, 190, Dig. 2; 260—2.5 AY; 264—41, 216, 331, Dig. 77